(12) United States Patent
Brookler

(10) Patent No.: US 7,640,255 B2
(45) Date of Patent: *Dec. 29, 2009

(54) METHOD FOR UTILIZING A MULTI-LAYERED DATA MODEL TO GENERATE AUDIENCE SPECIFIC DOCUMENTS

(75) Inventor: David Brookler, Los Angeles, CA (US)

(73) Assignee: SAP, AG, Walldorf (DE)

( * ) Notice: Subject to any disclaimer, the term of this patent is extended or adjusted under 35 U.S.C. 154(b) by 366 days.

This patent is subject to a terminal disclaimer.

(21) Appl. No.: 11/204,763

(22) Filed: Aug. 15, 2005

(65) Prior Publication Data

US 2006/0271572 A1 Nov. 30, 2006

Related U.S. Application Data

(63) Continuation of application No. 11/141,997, filed on May 31, 2005, and a continuation-in-part of application No. 11/142,809, filed on May 31, 2005, and a continuation-in-part of application No. 11/141,984, filed on May 31, 2005.

(51) Int. Cl.
*G06F 17/30* (2006.01)
*G06F 7/00* (2006.01)

(52) U.S. Cl. .................................. 707/100; 707/103 R
(58) Field of Classification Search ................ 707/100, 707/103 R, 104.1
See application file for complete search history.

(56) References Cited

U.S. PATENT DOCUMENTS

| | | | |
|---|---|---|---|
| 4,566,078 A | 1/1986 | Crabtree | |
| 5,228,121 A | 7/1993 | Fontaine et al. | |
| 5,375,164 A | 12/1994 | Jennings | |
| 5,416,903 A | 5/1995 | Malcom | |
| 5,442,782 A | 8/1995 | Malatesta et al. | |
| 5,655,130 A | 8/1997 | Dodge et al. | |
| 5,761,673 A | 6/1998 | Bookman et al. | |
| 5,822,503 A * | 10/1998 | Gass et al. | ............ 358/1.9 |
| 5,835,912 A | 11/1998 | Pet | |

(Continued)

OTHER PUBLICATIONS

Singh et al., Generating Association Rules from Semi-Structured Documents Using an Extended Concept Hierarchy, ACM 1997, pp. 193-200.

Spragins, Developing Hypertext Documents for an International Audience, ACM 1992, pp. 27-34.

*Primary Examiner*—Baoquoc N To
(74) *Attorney, Agent, or Firm*—Dalina Law Group, P.C.

(57) ABSTRACT

Audience specific documents targeted at a plurality of media types are generated by accessing data from a multi-layered data model comprising an audience hierarchy. When obtaining a data value for a particular audience, if that value does not exist for that audience then the audience hierarchy may be utilized to find the data value for an inherited audience. By adding regional, cultural or regulatory subdivisions within the audience hierarchy and inheriting large portions of existing audience specific data entries, a large number of audience specific documents may be generated with a minimal amount of data entry required. Audiences may be specified in a given order for traversal within the hierarchy and displayed in a data entry and editing application utilizing visual characteristics to inform a user if the value for a particular piece of data is inherited from another layer or utilized from the particular layer in use.

17 Claims, 6 Drawing Sheets

U.S. PATENT DOCUMENTS

| | | | |
|---|---|---|---|
| 5,944,790 A | 8/1999 | Levy | |
| 6,006,221 A | 12/1999 | Liddy et al. | |
| 6,018,742 A | 1/2000 | Herbert, III | |
| 6,370,498 B1 | 4/2002 | Flores et al. | |
| 6,418,439 B1 | 7/2002 | Papierniak et al. | |
| 6,480,836 B1 * | 11/2002 | Colby et al. | 707/3 |
| 6,516,312 B1 | 2/2003 | Kraft et al. | |
| 6,526,426 B1 | 2/2003 | Lakritz | |
| 6,542,898 B1 | 4/2003 | Sullivan et al. | |
| 6,623,529 B1 | 9/2003 | Lakritz | |
| 6,711,740 B1 | 3/2004 | Moon et al. | |
| 6,772,165 B2 | 8/2004 | O'Carroll | |
| 6,865,716 B1 | 3/2005 | Thurston | |
| 6,993,568 B1 | 1/2006 | Hauduc et al. | |
| 7,111,010 B2 * | 9/2006 | Chen | 707/102 |
| 2002/0002567 A1 | 1/2002 | Kanie et al. | |
| 2002/0049831 A1 | 4/2002 | Platner et al. | |
| 2002/0069049 A1 | 6/2002 | Turner | |
| 2002/0111933 A1 | 8/2002 | Noble et al. | |
| 2002/0143523 A1 | 10/2002 | Balaji et al. | |
| 2002/0162093 A1 | 10/2002 | Zhou et al. | |
| 2002/0193983 A1 | 12/2002 | Tokieda et al. | |
| 2003/0012558 A1 | 1/2003 | Kim et al. | |
| 2003/0093755 A1 | 5/2003 | O'Carroll | |
| 2003/0126559 A1 | 7/2003 | Fuhrmann | |
| 2003/0187827 A1 | 10/2003 | Sumitomo | |
| 2004/0103075 A1 | 5/2004 | Kim et al. | |
| 2004/0167784 A1 | 8/2004 | Travieso et al. | |
| 2005/0071345 A1 | 3/2005 | Lin | |
| 2005/0086579 A1 | 4/2005 | Leitner et al. | |
| 2005/0240392 A1 | 10/2005 | Munro et al. | |
| 2006/0026267 A1 * | 2/2006 | Godin et al. | 709/220 |
| 2006/0041428 A1 | 2/2006 | Fritsch et al. | |
| 2006/0150166 A1 * | 7/2006 | Devillers et al. | 717/141 |
| 2006/0217960 A1 | 9/2006 | Kato et al. | |
| 2006/0268107 A1 | 11/2006 | Weinberg et al. | |
| 2006/0271523 A1 | 11/2006 | Brookler et al. | |
| 2006/0288265 A1 | 12/2006 | Brookler | |
| 2007/0067297 A1 | 3/2007 | Kublickis | |
| 2007/0067728 A1 | 3/2007 | Lo et al. | |
| 2007/0157079 A1 | 7/2007 | Baker | |

* cited by examiner

Figure 1

MAIN DATA TABLE

| PRODUCT_ID | NAME_ID | DESCRIPTION_ID | ... |
|---|---|---|---|
| 220304 | 17 | 334 | ... |
| 220305 | 22 | 427 | ... |

Figure 2

DATA ATTRIBUTE TABLE

| NAME_ID | AUDIENCE_ID | NAME | ... |
|---------|-------------|---------------|-----|
| 17 | 0 | tennis sweater | ... |
| 17 | 1 | tennis jumper | ... |
| 22 | 0 | tennis ball | ... |

Figure 3

AUDIENCE ORDER TABLE

| audience_ID | audience_order | position | alive |
|---|---|---|---|
| 0 | 0;1;4;#;3;2 | 0 | TRUE |
| 1 | 1;0;#;4 | 1 | TRUE |
| 2 | 2 | 2 | FALSE |
| 3 | 3;0;1;2 | 3 | TRUE |
| 4 | 0;4;#;1 | 0 | TRUE |
| ... | ... | ... | |

Figure 4

AUDIENCE TABLE

| audience_ID | language | country | region | name | ... |
|---|---|---|---|---|---|
| 0 | eng | USA | whole | English US | ... |
| 1 | eng | AUS | whole | English Australia | ... |
| 2 | esp | MEX | whole | Spanish Mexico | ... |
| 3 | eng | USA | California | English Calif | ... |
| 4 | eng | CAN | whole | English CAN | |

METHOD FOR UTILIZING A MULTI-LAYERED DATA MODEL TO GENERATE AUDIENCE SPECIFIC DOCUMENTS

This application is a continuation in part of U.S. patent application Ser. No. 11/141,997, filed May 31, 2005 entitled "Method for Generating Documents Using Layer-Specific Inheritance Rules", the specification of which is hereby incorporated herein by reference. This application is a continuation in part of U.S. patent application Ser. No. 11/142,809, filed May 31, 2005 entitled "Multi-Layered Data Model for Generating Audience Specific Documents", the specification of which is hereby incorporated herein by reference. This application is a continuation in part of U.S. patent application Ser. No. 11/141,984, filed May 31, 2005 entitled "Interface for Indicating the Presence of Inherited Values in a Document", the specification of which is hereby incorporated herein by reference.

BACKGROUND OF THE INVENTION

1. Field of the Invention

Embodiments of the invention described herein pertain to the field of computer systems. More particularly, but not by way of limitation, one or more embodiments of the invention enable methods for utilizing a multi-layered data model to generate audience specific documents.

2. Description of the Related Art

There are many problems associated with generating a document for multiple audiences comprising differing languages in varying media types such as an electronic or print media catalog. Current systems comprise coarse grained internationalization capabilities that do not readily provide these capabilities. For example, a document that is targeted to more than one language may also need to take into account the different regional, regulatory, and cultural requirements of the audience for which the document is published. Furthermore, the generated document must be properly formatted regardless of the media type for which the document is generated. Generating a document for differing media types requires the entry of descriptive layout information that defines the required output for a particular media type. Current systems that attempt to perform this function are generally hardcoded and when a particular piece of data changes, all target media documents must be manually adjusted not only to modify the piece of data, but also the layout of the document. Furthermore, each document output for a given target media type must be laboriously adjusted to meet the needs of the particular media type, generally in different third-party applications.

Current systems for generating internationalized documents fail to take into account the complexities that cause documents to vary on a publication-by-publication basis. For example, the regional, regulatory, and cultural requirements of the audience are generally beyond the scope of current generation internationalization solutions. When publishing documents for a global audience, data that is an appropriate substitute in one instance of the document may not be an adequate substitute in a different instance. French regulations, for instance, prohibit imagery that shows a hypodermic needle whereas in other countries such images are permissible. The same concept is also applicable to language, cultural, and regional requirements associated with a particular document. Current systems provide mechanisms for publishing documents in multiple languages, but require brute force entry of multi-lingual data in a way that tends require large amounts of duplicate operator entries for similar languages, cultural, regional or regulatory specific embodiments of a document. For example, current systems require a complete set of entries for two languages that may only differ in a small way such as United Kingdom and United States English. Current systems do not allow for inheritance of values based on arbitrary divisions in unlimited dimensions and generally only apply to country, language and region for example.

Existing master data management systems require that product families (of which there may be thousands) be manually created. In these existing systems, a product family may be referred to as a presentation, a unit, an ad, or a module. Further, existing systems require that products records be manually added to the families, and also that they be manually moved to a different family if changes in the product record result in its no longer belonging to its original family. In current systems, removal of support for a given audience or media type requires deleting rows or columns in a database as the database is generally structured in current systems. Adding support for a new audience or media type requires copying large amounts of data, either rows or columns using current methods. Regardless of the underlying implementations significant duplicate effort is then required to update documents targeted at each audience and media type.

For at least the limitations described above there is a need for a system that eliminates data entry duplication and allows for the transparent generation of audience specific documents into multiple languages, regions, cultures or regulatory zones or any other user defined division and into a variety of media types.

SUMMARY OF THE INVENTION

One or more embodiments of the invention enable methods for utilizing a multi-layered data model to generate audience specific documents. The word "audience" for the purposes of this specification means a group of document consumers such as people or computers that are associated with a language, country, region, regulation, culture or any other user defined division.

When publishing a document for multiple audiences in multiple media types it is desirable, although not required, to subdivide the information in a main data table into manageable blocks of information. One or more embodiments of the invention define families of data records that indirectly subdivide a main data table into a subset of data that is generally based on an existing taxonomy in the main data table, for example the "category" field of the data records. A family is a subset of main table product records that are related by one or more common fields and/or attributes having the same value, and that may also have additional fields of family data, such as an image, a logo, a paragraph of descriptive text, bullets of specifications, and so on. In one or more embodiments of the invention, attributes correspond to fields of information that apply only to some rather than all of the main table records. For example, voltage may be an attribute that applies to motors but not to gears. Fields are in the main data table, attributes are not. Families are defined outside of the main data table and therefore indirectly subdivide the main data table. Families are stored in a family table and may be hierarchical related. Families enable master data to be efficiently published not only to paper, but also to non-paper media such as the Web in a manner that preserves the presentation and organization seen in printed catalogs, with the added benefit of fast, efficient product search.

Families are not random divisions of the main data table. Families exist only for actual value combinations that occur in the main table product records, dramatically reducing the number of families to precisely those containing records (and certainly no more than the number of main table product records), thereby resulting in a much more compact Family Hierarchy. If the entire set of possible values and value combinations were used when creating families, the Family Hierarchy would be unnecessarily large. Consider a repository with 200 categories, 500 manufacturers, and 10,000 products. If Category were to be partitioned by Manufacturer, the set of possible value combinations would result in 100,000 families (even though the main table contains only 10,000 product records). Most of these families would in fact contain no records, since for a particular category, only a small subset of manufacturers offers products (and conversely, each manufacturer offers just a small number of categories of products).

Laying out the families comprises setting parameters that control how destination documents are formatted for publication during the generation process. The families may be manipulated in a variety of ways including pivoting tables to maximize the functionality of the family. Publishing selected families in a given sequence can be used to further specify the generation of the document on a document by document basis. The laying out and publishing processes generate parameters that are fed into desktop publishing programs so that the metadata related to the look and feel of the finished document is stored in an embodiment of the invention as opposed to each desktop publishing program. This allows for independence of platform and media type.

When generating an audience specific document targeted at a particular media type, an audience hierarchy may be created and utilized for obtaining data for a desired audience. The audience hierarchy may be implemented as a tree or linear structure or any other structure comprising at least one entry so that at least one audience may be used in obtaining data from a data attribute table. For example when obtaining a data value for a particular audience, if that value does not exist for that audience then the audience hierarchy may be utilized to find the data value for an inherited audience. By adding regional, cultural or regulatory subdivisions within the audience hierarchy and inheriting large portions of existing audience specific data entries, a large number of audience specific documents may be generated with a minimal amount of data entry required. Audiences may be specified in a given order for traversal within the hierarchy and used in order to display data with visual characteristics to inform a user if the value for a particular piece of data is being used from the current layer or is inherited. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not altered when adding an audience, attributes are added where needed to the attribute table and an audience is defined in the audience table.

Using manageable subsets of data such as families in order to layout and publish a document along with the audience specific data enables audience and media type independence, in addition to desktop publishing program independence.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience.

Once the audience hierarchy is set up, entry and edit of data occurs in one or more embodiments of the invention after selecting a given audience identifier for interaction with the system. The audience identifier may be entered manually or automatically from the user or computer associated with a user. The audience identifier may specify the language, or the language and country, or the language, country and region, or the language, region and culture, or the culture and regulatory area or any other combination of audience identifying values. A document may be published at any time using the data entered and edited in the system.

Audience specific documents may be generated for publication by obtaining an audience identifier or audience order from an audience order table or structure. The order specifies the actual audience to utilize when accessing a data attribute table or data table comprising values for at least one audience. The value specific to a given audience is obtained from the data table using the first audience order identifier and the reference identifier of the value from a main data table. If the value exists, it is returned. If the value does not exist for a given audience order identifier and reference, then the audience order table may be accessed in order to find the next audience that may comprise the value. The next position found in the audience order table for a given audience identifier is utilized in order to access the data table. The processing repeats until a value is found or a stop flag is found in which case no value is supplied. Stop flags may be utilized in the audience hierarchy to allow for a user interface data entry and editing application to show all inherited values and yet allow for the non-publication of inherited values past a set level of inheritance in a generated document. In the remainder of this specification, use of tables and structures is synonymous unless specified otherwise.

Adding support for document for a given audience using embodiments of the invention is rapid as there is no need to add multiple rows for each entry in the main data table or add and populate fields in a main data table for each new audience. The data attribute table may be augmented with only those values that are unique to the new audience with respect to a set of data values corresponding to an audience that already exists in the data table. The main data table does not require altering in any way in order to add support for a new audience. For an audience that comprises all of the data of another audience for the data that currently exists in a main data table, the initial position set for the initial audience order identifier may be that of an entirely different audience meaning that the audience is being substituted for outright. When a data entry is added to the data attribute table that is different with respect to the first position audience for a given reference id then a new data attribute table entry may be created. In addition, the audience order identifier can be altered to use the child audience first. All other entries in the attribute data table would be obtained in this example by observing that the values do not exist for the specific child audience identifier and that the second audience order identifier corresponding to a parent is utilized to obtain these entries. In this manner, only one entry in a data attribute table separate from the main data table is added while the audience order table is updated to allow for the traversal to another audience when entries are not found for a given audience. The number of data entries in the data attribute table for each supported audience in general differs for audiences that inherit from each other with more dependent audiences having less entries in general.

Generation of an audience specific document may occur by traversing an audience hierarchy comprising audiences that may be enabled or disabled. Masking may be utilized in order to allow only certain portions of the audience specific document or certain variants of the audience specific document to be generated. Users may pay for access to a particular audience and may pay a separate fee for access to a second audience version of the document depending on the embodiment.

BRIEF DESCRIPTION OF THE DRAWINGS

FIG. 1 illustrates a main data table used in conjunction with one or more embodiments of the invention.

FIG. 2 illustrates a data attribute table used in conjunction with one or more embodiments of the invention.

FIG. 3 illustrates an audience order table used in conjunction with one or more embodiments of the invention.

FIG. 4 illustrates an audience table used in conjunction with one or more embodiments of the invention.

DETAILED DESCRIPTION OF THE INVENTION

Figure 5:
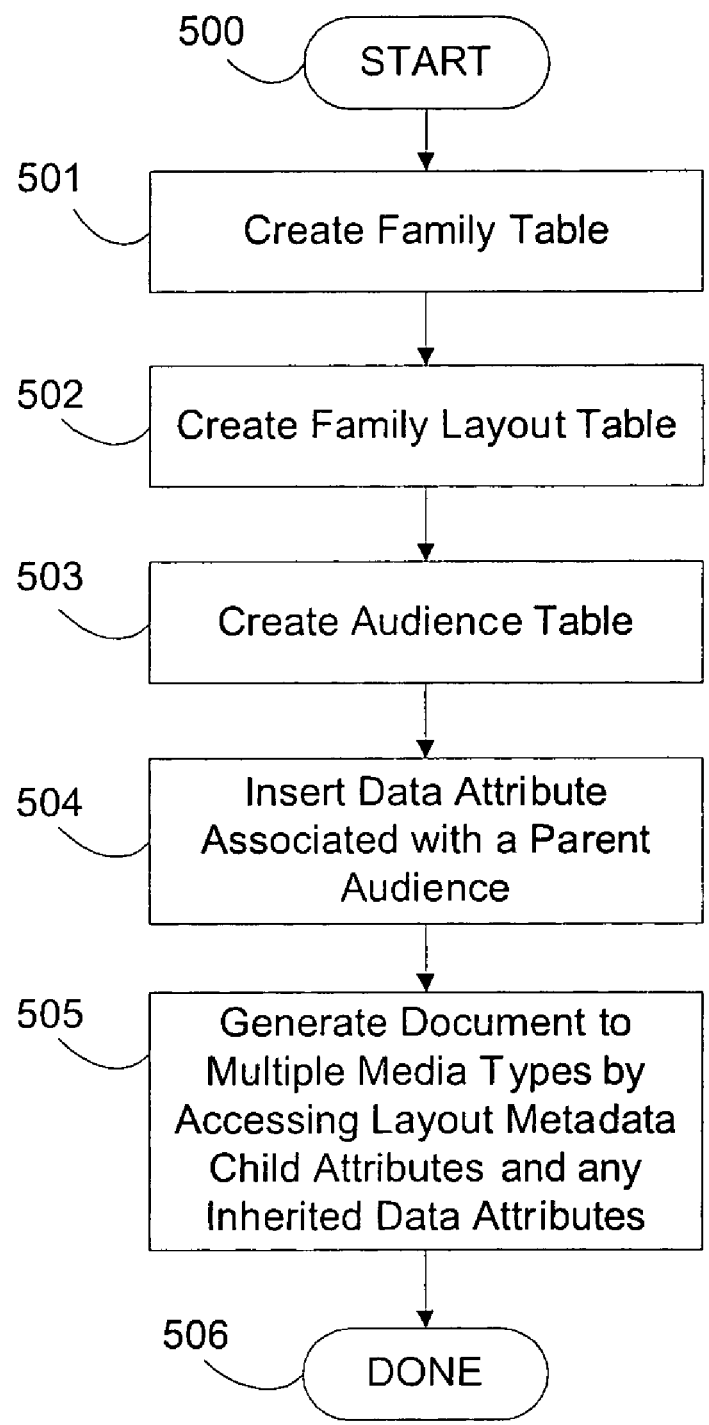
FIG. 5 illustrates a flow chart describing the steps for utilizing a multi-layered data model to generate audience specific documents.

A method for utilizing a multi-layered data model to generate audience specific documents will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention utilize a multi-layered data model to generate audience specific documents targeted at a particular media type. The word "audience" for the purposes of this specification means a group of document consumers such as people or computers that are associated with a language, country, region, regulation, culture or any other user defined division.

A multi-layered data model may be implemented as a tree or linear structure or any other structure comprising at least one entry so that at least one audience may be used in obtaining data from a data attribute table. FIG. 1 shows a main data table comprising products for example. The name of a product in this example is entered into another table namely the data attribute table shown in FIG. 2. For each audience that has a unique value for the given data attribute, an entry in the data attribute table may be created. For example product number 220304 shown in the main data table comprises an audience specific name that is obtained from the data attribute table when generating a document. In this case if the audience identifier is 0 then the name "tennis sweater" is obtained. If the audience identifier is 1 then the name "tennis jumper" is obtained. For example when obtaining a data value for a particular audience, if that value does not exist for that audience then the audience hierarchy may be utilized to find the data value for an inherited audience. In this case, if audience 1 is used in obtaining the name of product 220305, then reference name identifier 22 is used to look up the actual product name in the data attribute table. Since there is no name identifier and audience identifier combination that yields a name, the audience order table shown in FIG. 3 is referenced in order to obtain the next audience identifier to use in finding a suitable value via inheritance. Since the next value in the audience order field for audience 1 is 0, then audience 0 is used in looking up the value next in the data attribute table. In this way, only one entry for a given data entry is required since multiple audiences can share the value. By adding regional, cultural or regulatory subdivisions within the audience hierarchy and inheriting large portions of existing audience specific data entries, a large number of audience specific documents may be generated with a minimal amount of data entry required.

Defined audiences may be specified in a given order for traversal within the hierarchy and used in order to display data with visual characteristics to inform a user if the value for a particular piece of data is being used from the current layer or is inherited. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. For example as shown in FIG. 2, by adding any value such as was done for name identifier 22, that value is available to all audiences that comprise the audience 0 in their inheritance chain as shown in FIG. 3. The main data table shown in FIG. 1 is not altered when adding a new audience, instead only attributes are added to the data attribute table shown in FIG. 2, an audience is defined in the audience table in FIG. 4 and the audience is added to the audience order table shown in FIG. 3.

The initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. In the example shown in FIG. 2, if there a thousand separate entries related to tennis and only a few of the items differ in name between audiences, then the second audience addition comes at very little expenditure of labor in entering the data that differs.

After the audience hierarchy is set up, entry and edit of data occurs in one or more embodiments of the invention after selecting a given audience identifier for interaction with the system. The audience identifier may be entered manually or automatically from the user or computer associated with a user. The audience identifier may specify the language, or the language and country, or the language, country and region, or the language, region and culture, or the culture and regulatory area or any other combination of audience identifying values.

A document may be published at any time using the data entered and edited in the system. FIG. 4 shows some example audiences that comprise languages, countries and regions. This table could also comprise audiences for dry and wet counties for example and the data entries for documents generated for dry counties could comprise NULL values wherever an alcoholic beverage or description would appear in the document.

When publishing a document for multiple audiences in multiple media types it is desirable, although not required, to subdivide the information in a main data table into manageable blocks of information as previously described. One or more embodiments of the invention define families of data records that indirectly subdivide a main data table into a subset of data that is generally based on an existing taxonomy in the main data table, for example the "category" field of the data records. Laying out the families comprises setting parameters that control how destination documents are formatted for publication during the generation process. The families may be manipulated in a variety of ways including pivoting tables to maximize the functionality of the family. Publishing selected families in a given sequence can be used to further specify the generation of the document on a document by document basis. The laying out and publishing processes generate parameters that are fed into desktop publishing programs so that the metadata related to the look and feel of the finished document is stored in an embodiment of the invention as opposed to each desktop publishing program. This allows for independence of platform and media type.

FIG. 5 illustrates a flow chart describing the steps for utilizing a multi-layered data model to generate audience specific documents. After starting at 500, a family table is created at 501. This allows for manageable subsets of the main data table to be published. A family layout table is created at 502 in order to provide storage for layout metadata associated with a family. The layout metadata may be inherited or overridden in one or more embodiments of the invention. An audience table is created at 503 and using inheritance may obtain data values from other audiences specified in an inheritance order when the data values are not specified for a given audience. This allows for the support of numerous related audiences with minimal required effort. A data attribute is inserted into a parent audience at 504 where no value exists for a child audience. A document is generated at 505 by inheriting the parent data attribute that does not exist in the child audience and the document is generated into a plurality of media types such as HTML and paper. The generated document may exist as a WYSIWYG panel in one or more embodiments of the invention. Processing completes at 506.

Figure 6:
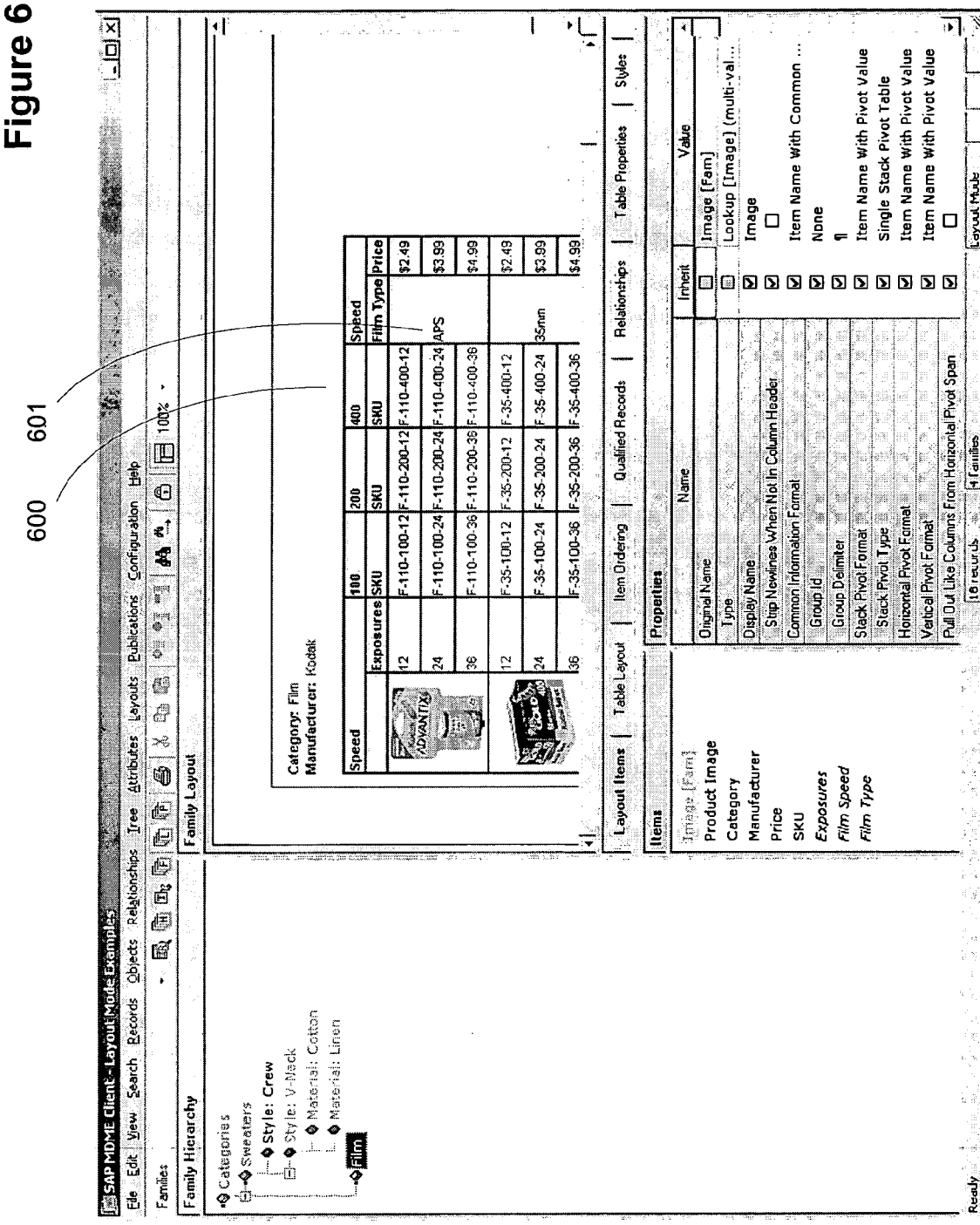
FIG. 6 illustrates an embodiment of a layout interface for generating audience specific documents.

FIG. 6 illustrates an embodiment of a layout interface for generating audience specific documents. WYSIWYG layout panel 600 shows the family "film" as it will appear in a plurality of publications of differing media types. Item 601 illustrates an audience specific data entry that is inherited in this example from a parent audience since no name was specified in the child audience for the given data item. In one or more embodiments this entry may be shown in bold print or in a different color to inform the user that the value is inherited, and/or the level of inheritance from which the data value has been obtained.

While the invention herein disclosed has been described by means of specific embodiments and applications thereof, numerous modifications and variations could be made thereto by those skilled in the art without departing from the scope of the invention set forth in the claims.

What is claimed is:

1. In a computer system, a method utilizing a multi-layered data model to generate an audience specific document comprising:

creating a family structure related to a main data structure wherein said family structure comprises at least one family that defines a sub-group of main data structure values from said main data structure wherein said sub-group of main data structure values are related by at least one value in said main data structure having a same value in a plurality of main data structure values;

creating layout metadata in a family layout structure for said at least one family, said layout metadata is configured to format an audience specific document;

creating an audience identified by an audience identifier stored in an audience structure wherein said audience structure comprises values for language, country and region;

creating at least one data attribute in a data attribute structure associated with said main data structure and said audience wherein said audience is associated with said audience identifier stored in said data attribute structure;

accepting a subset of data for said audience with respect to another audience into said data attribute structure wherein said subset of data is unique with respect to said another audience, wherein audience data not contained in said subset of data is inherited from at least one other parent audience, and wherein said audience and said another audience differ in one or more of language, country, region, regulatory or cultural designations;

creating an audience order structure establishing a selecting hierarchy for said at least one data attribute wherein said at least one data attribute is selected utilizing a parent audience identifier from a parent audience when said at least one data attribute does not exist in association with said audience identifier in said data attribute structure; and, generating said audience specific document of said at least one family comprising said at least one data attribute obtained from said parent audience of said audience for a plurality of media types using said layout metadata selected from said family layout structure corresponding to said at least one family; and displaying said audience specific document.

2. The method of claim 1 wherein said common elements are fields in said main data structure values are also related by at least one data attribute value that is held in a Structure external to said main data structure.

3. The method of claim 1 further comprising:

inserting at least one audience order identifiers into said audience order structure wherein said audience order structure comprises a hierarchical relationship between a plurality of audiences.

4. The method of claim 1 further comprising:

inserting a plurality audience order identifiers into said audience order structure wherein said audience order structure comprises a hierarchical relationship between a plurality of audiences; and, inserting a stop flag level for said audience in said audience order structure.

5. The method of claim 1 further comprising:

adding support for said audience without altering said main data structure.

6. The method of claim 1 further comprising:

disabling support for said audience by setting a disable flag for said audience.

7. The method of claim 1 further comprising:
enabling support for said audience by setting a enable flag for said audience.

8. The method of claim 1 further comprising:
dynamically updating a display to graphically depict said layout metadata using said data attribute as said layout metadata is modified.

9. The method of claim 1 further comprising:
depicting said layout metadata by graphically signifying an inheritance level of said at least one Data attribute.

10. The method of claim 1 wherein said plurality of media types comprises paper and markup.

11. The method of claim 1 wherein said generating said audience specific document further comprises interfacing to a desktop publishing program.

12. The method of claim 1 wherein said generating said audience specific document further comprises sending a modified data attribute to a desktop publishing program.

13. The method of claim 1 wherein said generating said audience specific document further comprises accepting a modified layout from a desktop publishing program.

14. The method of claim 1 wherein said generating said audience specific document further comprises: selecting values to publish.

15. The method of claim 1 wherein said generating said audience specific document further comprises: selecting families to publish.

16. The method of claim 1 wherein said generating said audience specific document further comprises: selecting a sequence of families to publish in an order of publication.

17. The method of claim 1 wherein said generating said audience specific document further comprises: overriding said layout metadata using publication specific metadata.

* * * * *

UNITED STATES PATENT AND TRADEMARK OFFICE
CERTIFICATE OF CORRECTION

PATENT NO. : 7,640,255 B2
APPLICATION NO. : 11/204763
DATED : December 29, 2009
INVENTOR(S) : David Brookler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 511 days.

Signed and Sealed this

Ninth Day of November, 2010

David J. Kappos
*Director of the United States Patent and Trademark Office*